(12) United States Patent
Sistach et al.

(10) Patent No.: US 12,343,813 B2
(45) Date of Patent: Jul. 1, 2025

(54) ADDITIVE MANUFACTURING METHOD FOR A METAL PART

(71) Applicant: SAFRAN AIRCRAFT ENGINES, Paris (FR)

(72) Inventors: Hugo Sistach, Moissy-Cramayel (FR); Cédric Pierre Jacques Colas, Moissy-Cramayel (FR); Terence Grall, Moissy-Cramayel (FR); Romaric Jean-Marie Piette, Moissy-Cramayel (FR); James Prodent, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 696 days.

(21) Appl. No.: 17/611,809

(22) PCT Filed: May 15, 2020

(86) PCT No.: PCT/FR2020/050812
§ 371 (c)(1),
(2) Date: Nov. 16, 2021

(87) PCT Pub. No.: WO2020/229784
PCT Pub. Date: Nov. 19, 2020

(65) Prior Publication Data
US 2022/0234107 A1  Jul. 28, 2022

(30) Foreign Application Priority Data
May 16, 2019  (FR) ..................... 1905161

(51) Int. Cl.
*B23K 26/144* (2014.01)
*B22F 10/22* (2021.01)
(Continued)

(52) U.S. Cl.
CPC ............ *B23K 26/144* (2015.10); *B22F 10/22* (2021.01); *B22F 10/25* (2021.01); *B22F 10/28* (2021.01);
(Continued)

(58) Field of Classification Search
None
See application file for complete search history.

(56) References Cited

U.S. PATENT DOCUMENTS 10,981,247 B2   4/2021  Seince et al.
2012/0132627 A1  5/2012  Wescott et al.
(Continued)

FOREIGN PATENT DOCUMENTS

CN   108161229 A    6/2018
EP   1887107 A2 *  2/2008  ............ B22F 3/1055
FR   3 064 509 A1  10/2018

OTHER PUBLICATIONS

CN 108161229 machine translation (Year: 2018).*
(Continued)

*Primary Examiner* — Geoffrey S Evans
(74) *Attorney, Agent, or Firm* — CHRISTENSEN O'CONNOR JOHNSON KINDNESS PLLC

(57) ABSTRACT

A method for additive manufacturing deposits material on a part forming a substrate, wherein the part forming a substrate is made of a metal alloy. The method includes a step of low-energy deposition corresponding to a surface energy of less than 400 J/mm², on a predefined surface to be deposited, in order to form a base layer. The method further includes a step of high-energy deposition, corresponding to a surface energy greater than 500 J/mm², by depositing a wire on the base layer already formed.

11 Claims, 4 Drawing Sheets

(51) Int. Cl.
 *B22F 10/25*   (2021.01)
 *B22F 10/28*   (2021.01)
 *B22F 10/36*   (2021.01)
 *B23K 26/06*   (2014.01)
 *B23K 26/342*   (2014.01)
 *B33Y 10/00*   (2015.01)
 *B33Y 80/00*   (2015.01)
 *B22F 12/45*   (2021.01)
 *B23K 101/00*   (2006.01)
 *B23K 103/04*   (2006.01)
 *B33Y 70/00*   (2020.01)
 *F01D 25/24*   (2006.01)

(52) U.S. Cl.
 CPC .......... *B22F 10/36* (2021.01); *B23K 26/0608* (2013.01); *B23K 26/342* (2015.10); *B33Y 10/00* (2014.12); *B33Y 80/00* (2014.12); *B22F 12/45* (2021.01); *B23K 2101/001* (2018.08); *B23K 2103/04* (2018.08); *B33Y 70/00* (2014.12); *F01D 25/24* (2013.01)

(56) References Cited

U.S. PATENT DOCUMENTS

| | | | |
|---|---|---|---|
| 2013/0075575 A1 | 3/2013 | Abe et al. | |
| 2017/0364058 A1* | 12/2017 | Jagdale | G05B 19/4099 |
| 2018/0178325 A1* | 6/2018 | Wahl | B23K 26/127 |
| 2019/0054537 A1* | 2/2019 | Mottin | B22F 7/06 |

OTHER PUBLICATIONS

English translation of Written Opinion mailed Sep. 10, 2020, issued in corresponding International Application No. PCT/FR2020/050812, filed May 15, 2020, 9 pages.

International Preliminary Report on Patentability mailed Nov. 16, 2021, issued in corresponding International Application No. PCT/FR2020/050812, filed May 15, 2020, 11 pages.

International Search Report mailed Sep. 10, 2020, issued in corresponding International Application No. PCT/FR2020/050812, filed May 15, 2020, 5 pages.

Written Opinion mailed Sep. 10, 2020, issued in corresponding International Application No. PCT/FR2020/050812, filed May 15, 2020, 10 pages.

Chinese Office Action mailed Nov. 1, 2023, issued in corresponding Chinese Patent Application No. 202080048341.X, filed Dec. 30, 2021, 12 pages.

* cited by examiner

FIG. 5
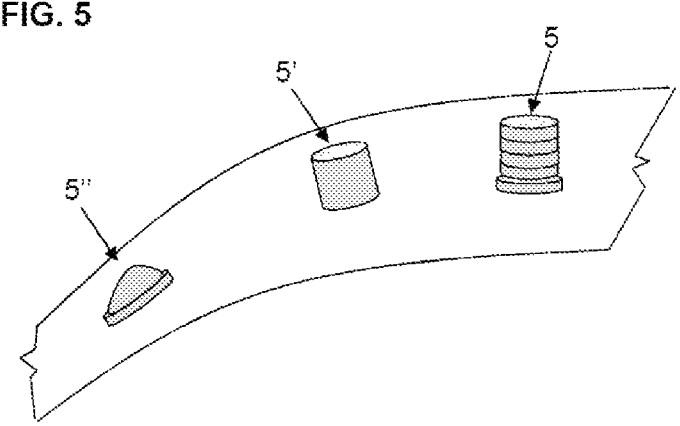
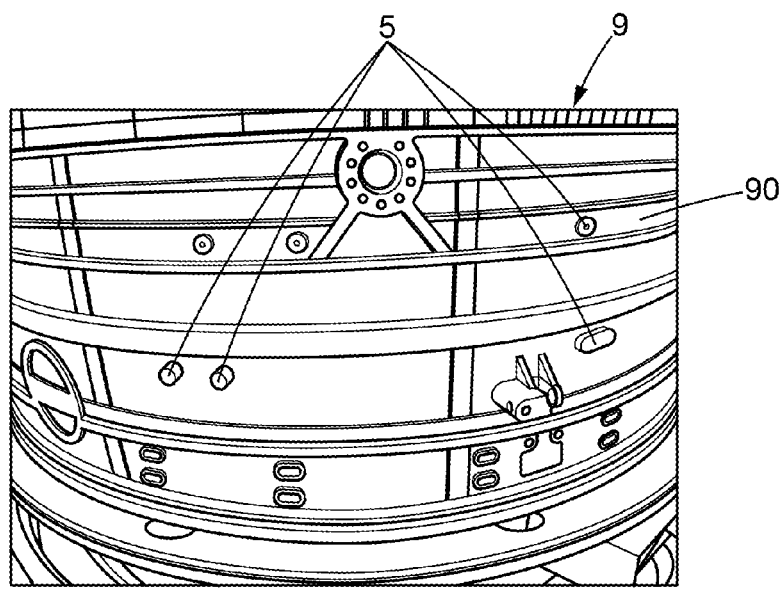
FIG. 6

ADDITIVE MANUFACTURING METHOD FOR A METAL PART

TECHNICAL FIELD OF THE INVENTION

The present invention relates to a method for the additive manufacturing of a metal part. The present invention relates in particular to thin metal alloy parts, and especially to parts that can be part of a turbomachine for an aircraft.

PRIOR ART

In this text, "additive manufacturing method" means both the initial manufacture of the part and the repair of an already manufactured part (by any technique) and the recharging of an area by "additive manufacturing", i.e., by a material input which can be an LMD method as below. For example, additive manufacturing methods are known that involve depositing material on a part forming a substrate with a localised energy input that allows the material to be brought to melting temperature locally.

If a laser is used to provide the energy, these methods are called "LMD" for Laser Metal Deposition.

When one wants to form a boss of a significant height by such an additive manufacturing method, one of the additive manufacturing methods consists in adding material by means of a metal wire (technique called LMD wire). In this way, several strands of material can be formed, preferably adjacent to each other, by melting a wire used as a filler metal. The heat source is for example a laser beam. By stacking several layers of molten wire, it is possible to form an boss several millimetres high in relation to the substrate.

However, for thin metal alloy part forming substrates, typically parts less than 2 mm thick, the LMD technique with wire deposition requires a significant energy input, and this energy input tends to impact and deform the part forming a substrate on which the deposition is performed.

For example, if we take a structural part such as a casing shroud, this is typically a part extending over a large surface area with a local thickness of less than 2 mm and this part must carry a plurality of local forms to attach auxiliary equipment thereto.

In addition, there is a constraint on manufacturing times, which encourages the use of fast methods to obtain the desired parts.

A need therefore arose to provide a solution to rapidly create a boss by an additive manufacturing method on a part with a thickness of less than 2 mm, without substantially deforming the said part.

In the configuration of a recharging of an existing part, it may be desired that the deformation induced by the addition of material does not exceed a predetermined value, e.g. 0.5 mm or 1 mm, as otherwise there may in some cases be buckling of the part or a negative impact on the microstructure, but this has to be assessed with regard to a very low deposition rate, implying an excessively long manufacturing time and cost.

SUMMARY OF THE INVENTION

It is in this context that an additive manufacturing method is proposed by depositing material on a part forming a substrate, the said part forming a substrate being made of metal alloy, the method comprising:

/a/—at least one step of low-energy deposition, corresponding to a surface energy of less than 400 J/mm$^2$, on a predefined surface to be deposited, to form a base layer, /b/—at least one step of high-energy deposition, corresponding to a surface energy greater than 500 J/mm$^2$, by depositing a wire (understood to be at least one wire) on the base layer already formed.

Thanks to these arrangements, the thermally affected area is relatively limited, as the base layer is made by a step of low-energy deposition and regarding the step(s) of high-energy deposition, the base layer naturally provides a shielding effect which mitigates the thermal impact of the high-energy deposition on the part forming a substrate. That said, the steps of high-energy deposition are used to produce the desired form in the shortest possible method time, as there is no need for further machining or forming on the part.

To obtain the desired surface energy, the following 3 parameters are determined: beam power, surface of the impact area and feed rate.

In various embodiments of the invention, one or both of the following provisions, individually or in combination, may optionally be used in addition.

In one aspect, the part forming a substrate has a thickness (e3) of less than 2 mm at the target location of the deposition. In this case, the aim will preferably be a deformation induced by the proposed method of less than 0.3 mm, preferably less than 0.2 mm. The proposed method thus makes it possible to process thin parts, such as certain casings or shrouds, various trim parts that can be found in an aircraft and in particular in the turbomachine. In this case, for initial manufacture, the casting step may be simplified and then any desired form(s) can be added using the proposed method.

According to another aspect, a maximum deformation stress is also established, the said part forming a substrate (3) having to undergo a deformation of less than 1 mm. Advantageously, the method may be applied regardless of the thickness of the part forming a substrate, the parameter forming the limiting stress being the deformation undergone by the part during the recharging method, or even during its initial manufacture if it is very thin.

In another aspect, the step of low-energy deposition is performed with a surface energy between 50 J/mm$^2$ and 200 J/mm$^2$, whereby advantageously a low thermal impact on the substrate is observed. In one aspect, one pass allows material to be deposited to a height of about 0.5 mm.

In another aspect, the step of high-energy deposition is performed with a surface energy between 800 J/mm$^2$ and 1200 J/mm$^2$. In one aspect, one pass allows material to be deposited to a height of between 1 mm and 1.5 mm. This allows for a fast execution of the wire passes. In another aspect, during the step of low-energy deposition (/a/), metal in powder form is supplied and sprayed onto the substrate via the energy source. This gives the method flexibility and controllability. This technique may be summarised in the same way as the LMD wire technique as presented above, except that the powder replaces the wire.

In another aspect, the energy source is a laser. A first laser source can be used for the step of low-energy deposition with a power of about 500 W (within 10%); the so-called powder LMD technique. A second laser source may be used for the step of high-energy deposition with a power of about 1000 W (within 10%); the so-called wire LMD technique.

It should be noted, however, that for the step(s) of high-energy deposition, sources other than a laser may be used. Thus, instead of a wire LMD deposition technique, it is possible to use, for example, as well-known methods:

a TIG method (arc welding method) with a non-melting electrode, in the presence of a filler metal if necessary.

TIG is an acronym for Tungsten Inert Gas, where Tungsten is the electrode and Inert Gas is the type of plasma gas used, or a CMT (Cold Metal Transfer) method, a welding method which, in comparison to the more conventional MIG/MAG welding, is relatively cold, via a permanent transition from hot to cold. The advantage of the laser is, however, that it can perfectly control the impact area of the energy beam and maintain the energy delivered.

In another aspect, the part forming a substrate is formed from a metal alloy based on steel filled with nickel or titanium. These are high-performance materials for aircraft turbomachine parts.

In another aspect, the part forming a substrate is formed from INCONEL 718.

In another aspect, the part forming a substrate is formed from TA6V titanium.

In another aspect, provision may be made for a waiting time between step /a/ and step /b/. The temperature of the deposited material can then be allowed to drop before material is deposited on top of it, thus limiting the thermal impact on the underlying substrate part.

In another aspect, provision may be made for several successive steps of low-energy deposition. Optionally, provision may be made for waiting times between the different low-energy deposition passes. This limits the temperature rise and in particular the local peak temperature in the part forming a substrate underneath the deposition, thus limiting the extent of the thermally affected area.

In another aspect, the height of the low-energy layer(s) has a dimension equivalent to the transverse excursion (R1) of the thermally affected area. Here, a transverse excursion of the thermally affected area is understood to mean an area around the area that has received the deposition and is thermally affected by it. For example, for a discoidal deposition, we see a corolla-shaped area around the discoidal form.

According to another aspect, wherein provision may be made for several successive steps of high-energy deposition. A projection of any desired height, even quite large, can thus be formed by using several high-energy deposition passes.

In another aspect, the powdered and/or wire material supplied is identical to the substrate material. This results in a coherent fusion and an optimal crystalline bond.

In yet another aspect, the finished form formed by the base layer (which is the first layer deposited on the substrate) and the additional layer(s) (subsequently deposited on the base layer), forms a boss with a height (H5 hereinafter) greater than the thickness (e3 hereinafter) of the substrate at the location of the deposition of the layers. There is then no real limit to the height of the form to be made.

According to another aspect, provision is made to use a thermal scrap part which is arranged adjacent to the part forming a substrate opposite the deposition area. This scrap part can be made of copper, for example, and acts as a thermal bridge to dissipate heat.

A scrap part is defined as a part that is placed opposite the worked face of the work part and to which a force is applied to hold it against the work part. Preferably it has at least locally the same form as the work part. It allows, via a mechanical support, to reduce the deformations of the part and the slumps which could exist at the time of the addition of bosses on the recharging area. In addition, such scrap parts are made of copper and thus allow the heat accumulated in the part to be better evacuated. This limits deformations of part during operation. The invention also relates to a turbomachine intermediate casing shroud for an aircraft comprising one or more bosses obtained by the method described above, considered with all or part of its characteristics.

BRIEF DESCRIPTION OF THE FIGURES

Further aspects, purposes and advantages of the invention will become apparent from the following description of a non-limiting example of an embodiment of the invention. The invention will also be better understood with reference to the attached drawings in which:

FIG. 5 shows a part of a turbomachine casing shroud,

FIG. 6 illustrates an example of a turbomachine intermediate casing shroud for an aircraft.

Figure 1:
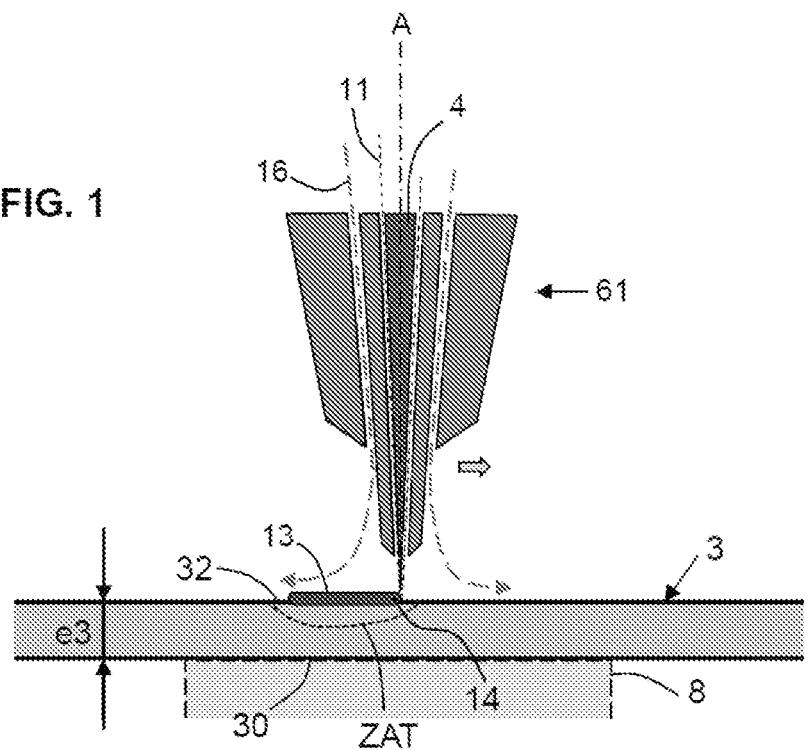
FIG. 1 illustrates a step of low-energy deposition on a metal substrate part according to one embodiment of the invention.

In the aeronautical field, turbomachines are complex machines that are made up of a multitude of technical parts. To manufacture such technical parts, manufacturing methods such as casting, forging, stamping, machining, electroerosion, surface treatment and heat treatment are typically used. In addition, additive manufacturing techniques are undergoing significant development, and this is the subject of the following presentation.

In the various figures, the same references refer to identical or similar elements.

DETAILED DESCRIPTION OF THE INVENTION

FIG. 6 illustrates a turbomachine intermediate casing shroud for an aircraft, generally referenced 9. Various forms are desired in projection from the main body of the casing 90, i.e. external projection in the direction of thickness or height, both terms being synonymous; these forms are identified generically by the reference 5.

The thickness is the dimension of the part that is at least 10 times smaller than one of its other dimensions, length and width respectively, assuming a flat part. In the case of the intermediate casing shroud 9, the thickness or height is along the Z-axis, in the orthonormal reference frame X,Y,Z, the axis of the (annular) shroud being (shroud mounted in the turbomachine) the X-axis, which is the longitudinal axis of the turbomachine, or axis of rotation of the rotor part (turbine/compressor) with respect to the stator part (casing for example).

The proposed method involves metal deposition on a part forming a substrate referenced 3. The part forming a substrate has a thickness e3 of less than 2 mm at the target location of the deposition. Any thickness e3 between 1 mm and 2 mm is considered for the application of the proposed method.

The part forming a substrate is made of metal alloy. The material of the part can be a nickel alloy of the N18 type. The material of the part can be an Astroloy™ type alloy. The material of the part can be an INCONEL 718 type alloy. The material of the part can be a TA6V type titanium alloy.

The proposed method provides for making a first deposition of material with low thermal impact on the part forming a substrate and then making a second, more productive deposition of material that allows a substantial amount of material to be deposited quickly over the first deposition.

More precisely, provision is made for a first step, referenced /a/.

This is /a/ a step of low-energy deposition. This low-energy input is in practice quantified by a surface energy of less than 400 J/mm². Preferably, the deposition can be carried out with a surface energy of between 50 J/mm² and 200 J/mm². The material is supplied in powder form 11. This is a metallic material, similar or identical to the metallic material of the substrate part. A first laser source 4 with a power of around 500W can be used for the step of low-energy deposition.

In another aspect, for the step of low-energy deposition, the laser power can be between 200W and 700W. The scanning speed of the laser can be between 1200 mm/s and 2000 mm/s. The diameter of the surface illuminated by the laser can be between 100 μm and 1 mm. The combination of laser power, impact area and scanning speed allows the desired surface energy to be achieved for a low surface energy input as mentioned above.

One or more deposition passes can be made with this low-energy input. Advantageously, each pass deposits material to a height of 0.5 mm (to within 20%).

A base layer is thus formed, referenced 1 for the first pass and 1a, 1b respectively, for the subsequent passes. The passes can be considered as sub-steps (referenced a2, a3, in FIG. 4) of the first step /a/.

After the first step, provision is made for a second step, referenced /b/.

This is /b/ a step of deposition with a high-energy input. This high-energy input is in practice quantified as a surface energy of over 500 J/mm². Preferably, the deposition can be carried out with a surface energy of between 800 J/mm² and 1200 J/mm.

The material is supplied in the form of wire 21. The wire in question is a metallic material, similar or identical to the metallic material of the substrate part. The wire in question can be produced by an extrusion method and stored in a spool or reel. According to one configuration, the cross-section of this wire is round. However, a different cross-section, e.g. hexagonal, octagonal, decagonal etc., is not excluded.

The molten wire is deposited on the base layer already formed. A second laser source 4' with a power of about 1000W or more can be used for the step of high-energy deposition. The source is emitted by a laser head 63, for example a CO2, YAG or other laser.

In another aspect, for the step of high-energy deposition, the laser power may be between 800 W and 1000 W. The scanning speed of the laser may be between 100 mm/s and 1500 mm/s. The diameter of the illuminated surface can be between 100 μm and 1 mm. The combination of laser power, impact area and scanning speed allows to obtain a desired surface energy for a high surface energy input as mentioned above.

In step /b/, an additional layer is formed, referenced 2 for the first pass and 2a, 2b, 2c, 2d for the subsequent passes. The passes can be considered as sub-steps (referenced b2, b3) of the second step /b/.

Note that provision may be made for a waiting time between step /a/ and step /b/. While waiting for the temperature of the deposited material to drop in order to deposit material on top again, this limiting the thermal impact in the underlying substrate part; this limits the extent of the thermally affected area ZAT, both in depth and in transverse excursion.

The material supplied in powder and/or wire form is preferably identical to the substrate material. However, the material provided, either in powder or wire form, may be of a different shade to the material of the substrate 3.

Generally, more details on how to perform the /b/ step can be found in the applicant's document FR3046739.

In FIG. 1, a metal powder deposition head 61 is shown, with the laser beam 4 centred on the axis A, an annular powder dispensing nozzle 11, an annular argon flow dispensing nozzle 16. This type of metal powder dispensing head associated with a laser beam is known per se and therefore not detailed further in this document.

In the example shown, the head moves to the right and at the point of impact of the laser beam 14, the powder melts and then solidifies as a bead of deposited material 13.

Figure 2:
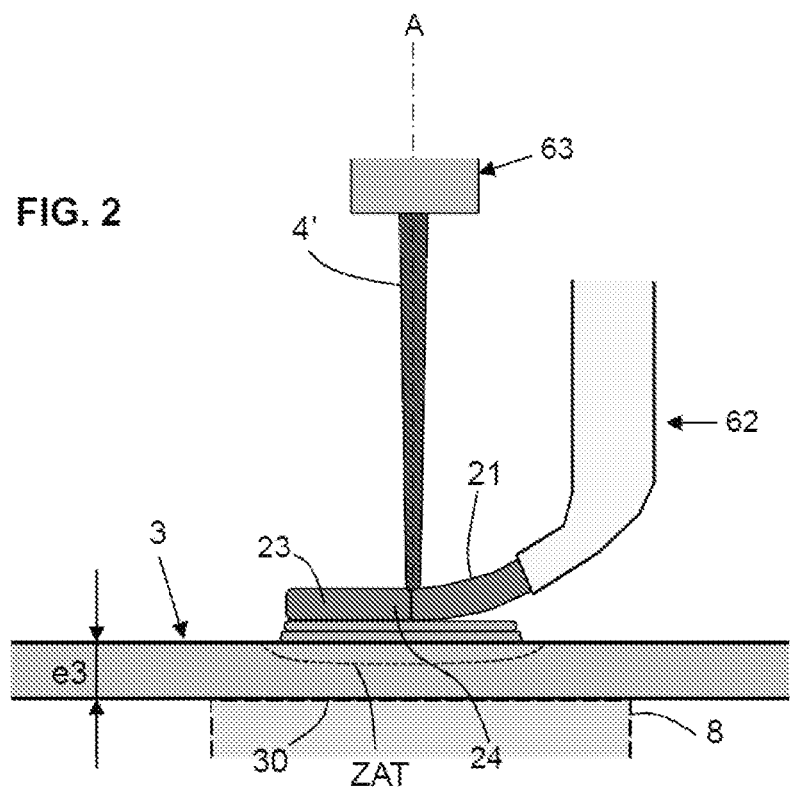
FIG. 2 illustrates a step of high-energy deposition on the metal substrate part, following the step of low-energy deposition.

In FIG. 2, a metal wire deposition head 62 is shown, with the laser source 63 emitting a laser beam 4' centred on the A-axis, the deposition head 62 extends forward of the axis as the head moves.

In the example shown, the head advances to the right and at the point of impact of the laser beam 24, the wire melts and then solidifies as a bead of deposited material 23. The method may involve going back and forth to form several strands of molten wire from each other. Optionally, provision is made to use a thermal scrap part, referenced 8, which is arranged adjacent to the inner surface 30 of the substrate.

This scrap part 8 can be made of copper, for example, and acts as a thermal bridge to dissipate heat and avoid temperature peaks inside the part forming a substrate 3.

Thanks to the presence of this scrap part 8, the depth of the thermally-affected area referenced 'e' can be limited and remain relatively moderate, especially when compared to a high-energy deposition as a first step.

Figure 4:
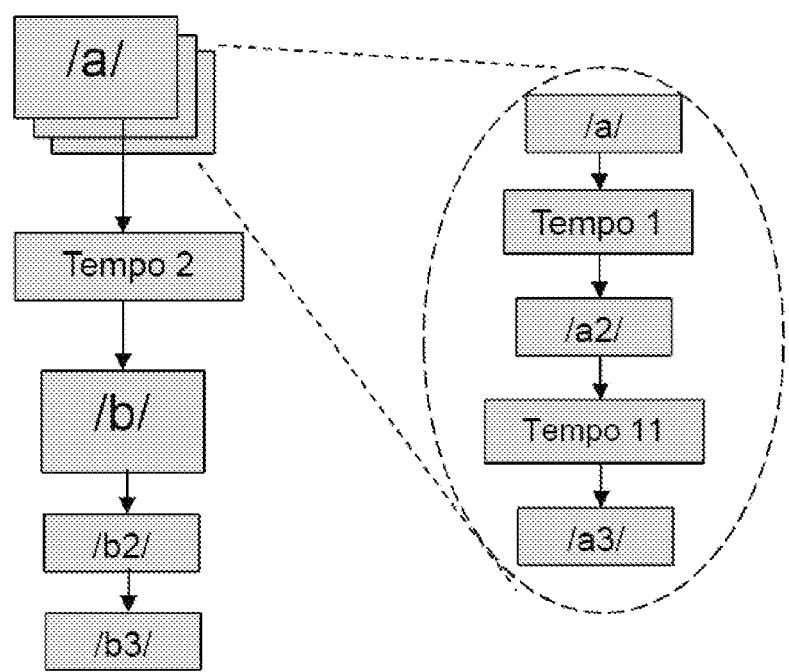
FIG. 4 illustrates an example of a sequence of steps.
Figure 7:
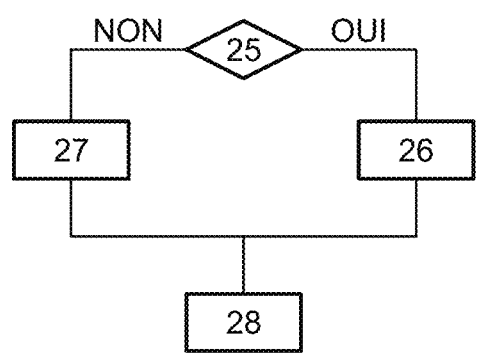

FIG. 4 illustrates various waiting times. A Tempo2 waiting time is provided between the first step /a/ and the second step /b/. A Tempo1 waiting time is provided between the first two sub-steps of the first step. A Tempo11 waiting time is provided between two other sub-steps of the first step.

Figure 3:
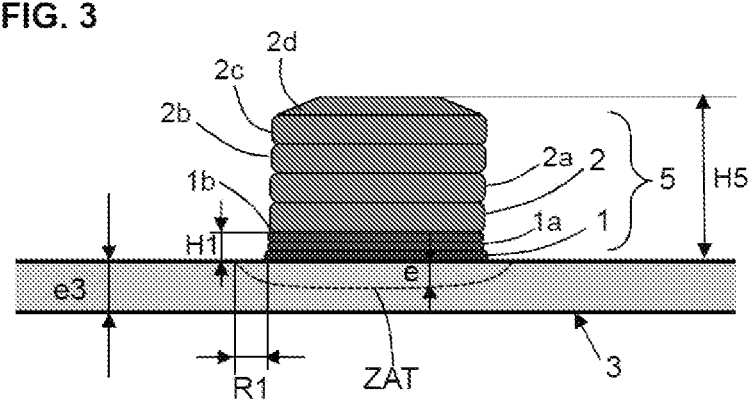
FIG. 3 illustrates a finished form obtained by the proposed method.

In FIG. 3, it can be seen that the height H1 of the low-energy layer(s) has a dimension equivalent to the transverse excursion R1 of the thermally affected area (ZAT). The transverse excursion of the thermally-affected area can have different forms; it extends around the area which received the deposition and which is thermally affected thereby. For example, for a discoidal deposition, we see a corolla-shaped area around the discoidal form.

Typically, H1 and R1 will be in the range of 2-5 mm.

Typically, the overall deposition rate achieved by the proposed method may reach 800 cm³ per hour. For example, for the steps of low-energy deposition, the deposition rate may be in the order of 100 cm³/h; for the steps of high-energy deposition, the deposition rate may be in the order of 1000 cm³/h.

Depending on the ratio of surface area to height, the larger the surface area and the lower the height, the more the low-energy method will be used compared to the high-energy method.

FIG. 5 shows that several forms of brushing can be achieved by the method described above. For example a first cylindrical boss 5 with a slightly wider base, another pure cylindrical boss 5', and a boss with a rounded top 5".

In another configuration not shown in the figures, the thickness of the part forming a substrate is not limited (e3>2 mm) but the method requires maximum deformation stress.

For example, the said part forming a substrate 3 must undergo a deformation of less than 0.5 mm or less than 1 mm. By starting with one or more low-energy steps and then continuing with one or more high-energy steps, the thermal impact on the part can also be limited and the thermally-affected area ZAT can be kept as small as possible.

Note that instead of moving the heads, one could alternatively move the part 3 for the deposition(s) while keeping the laser head stationary.

The invention claimed is:

1. A method for additive manufacturing by depositing material on a part forming a substrate, the said part forming a substrate being made of a metal alloy, the method comprising the steps of:
    forming a base layer by low-energy deposition, corresponding to a surface energy of less than 400 J/mm$^2$, on a predefined surface to be deposited, and
    depositing a wire on the base layer by high-energy deposition, corresponding to a surface energy greater than 500 J/mm$^2$, thereby forming one or more additional layers,
    the base layer providing a shielding effect that mitigates the thermal impact of the step of the depositing a wire on the base layer by high-energy deposition on the substrate part.

2. The method according to claim 1, wherein the part forming a substrate has a thickness of less than 2 mm at a target location of the deposition.

3. The method according to claim 1, wherein a maximum deformation stress is further established, the part forming a substrate having to undergo a deformation of less than 1 mm.

4. The method according to claim 1, wherein during the step of forming a base layer by low-energy deposition, metal in powder form is provided.

5. The method according to claim 1, wherein the energy source is a laser.

6. The method according to claim 1, wherein the part forming a substrate is formed from a metal alloy based on steel filled with nickel or titanium.

7. The method according to claim 1, wherein provision is made for a waiting time (Tempo1) between the step of forming a base layer by low-energy deposition and the step of depositing a wire on the base layer by high-energy deposition.

8. The method according to claim 1, wherein provision is made for several successive steps of low-energy deposition.

9. The method according to claim 1, wherein provision is made for several successive steps of high-energy deposition.

10. The method according to claim 1, wherein the material supplied in powder and/or wire form is identical to the material of the part forming a substrate.

11. The method according to claim 1, wherein the finished form formed by the base layer and the additional layer(s) deposited thereon, forms a boss of height greater than a thickness of the part forming a substrate at the location of the deposition.

* * * * *